(12) United States Patent
Andersen

(10) Patent No.: US 7,562,359 B1
(45) Date of Patent: Jul. 14, 2009

(54) USER PROCESS OBJECT CODE INSTALLER

(75) Inventor: Peder C. Andersen, Sunnyvale, CA (US)

(73) Assignee: Wind River Systems, Inc., Alameda, CA (US)

( * ) Notice: Subject to any disclaimer, the term of this patent is extended or adjusted under 35 U.S.C. 154(b) by 911 days.

(21) Appl. No.: 10/929,346

(22) Filed: Aug. 26, 2004

(51) Int. Cl.
*G06F 9/445* (2006.01)
*G06F 15/167* (2006.01)
*G06F 9/46* (2006.01)

(52) U.S. Cl. ............... 717/175; 717/176; 709/213; 709/214; 709/215; 709/216; 718/105; 718/106

(58) Field of Classification Search ............... None
See application file for complete search history.

(56) References Cited

U.S. PATENT DOCUMENTS

| | | | | |
|---|---|---|---|---|
| 5,729,710 A | * | 3/1998 | Magee et al. | 711/203 |
| 6,263,491 B1 | * | 7/2001 | Hunt | 717/130 |
| 6,321,276 B1 | * | 11/2001 | Forin | 710/3 |
| 6,637,023 B1 | * | 10/2003 | Ginsberg | 717/122 |

* cited by examiner

*Primary Examiner*—Chuck O Kendall
(74) *Attorney, Agent, or Firm*—Fay Kaplun & Marcin, LLP

(57) ABSTRACT

A computer implemented method of computer implemented method for installing a code object in a user process virtual memory space, while the user process is running is provided. The user process is run in a virtual memory space. A controller process is run in a different virtual memory space than the user process. The control process requests to a kernel module to install the code object into the virtual memory space of the user process. The kernel module installs the code object into the virtual memory space of the user process, while the user process is running.

11 Claims, 16 Drawing Sheets

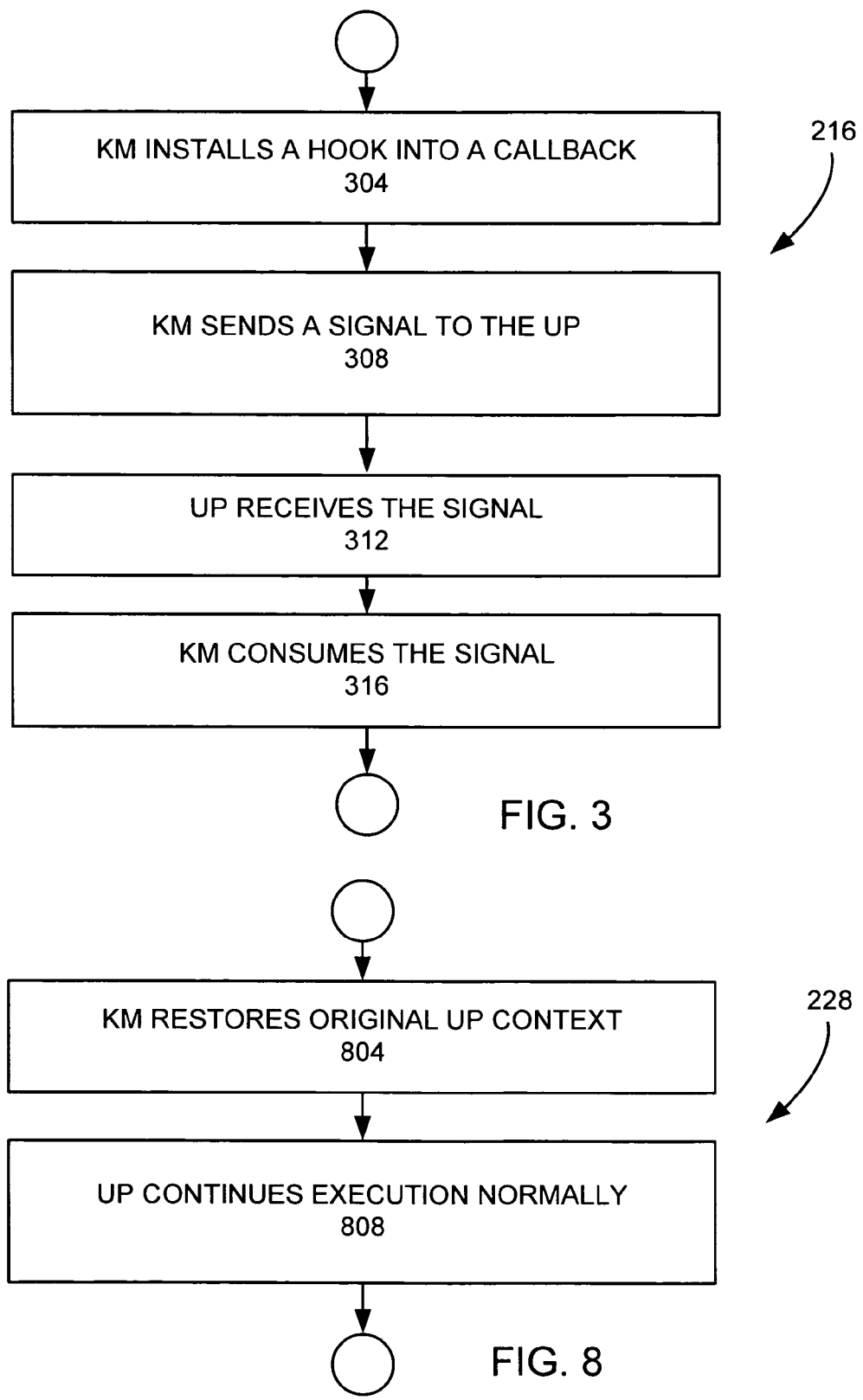

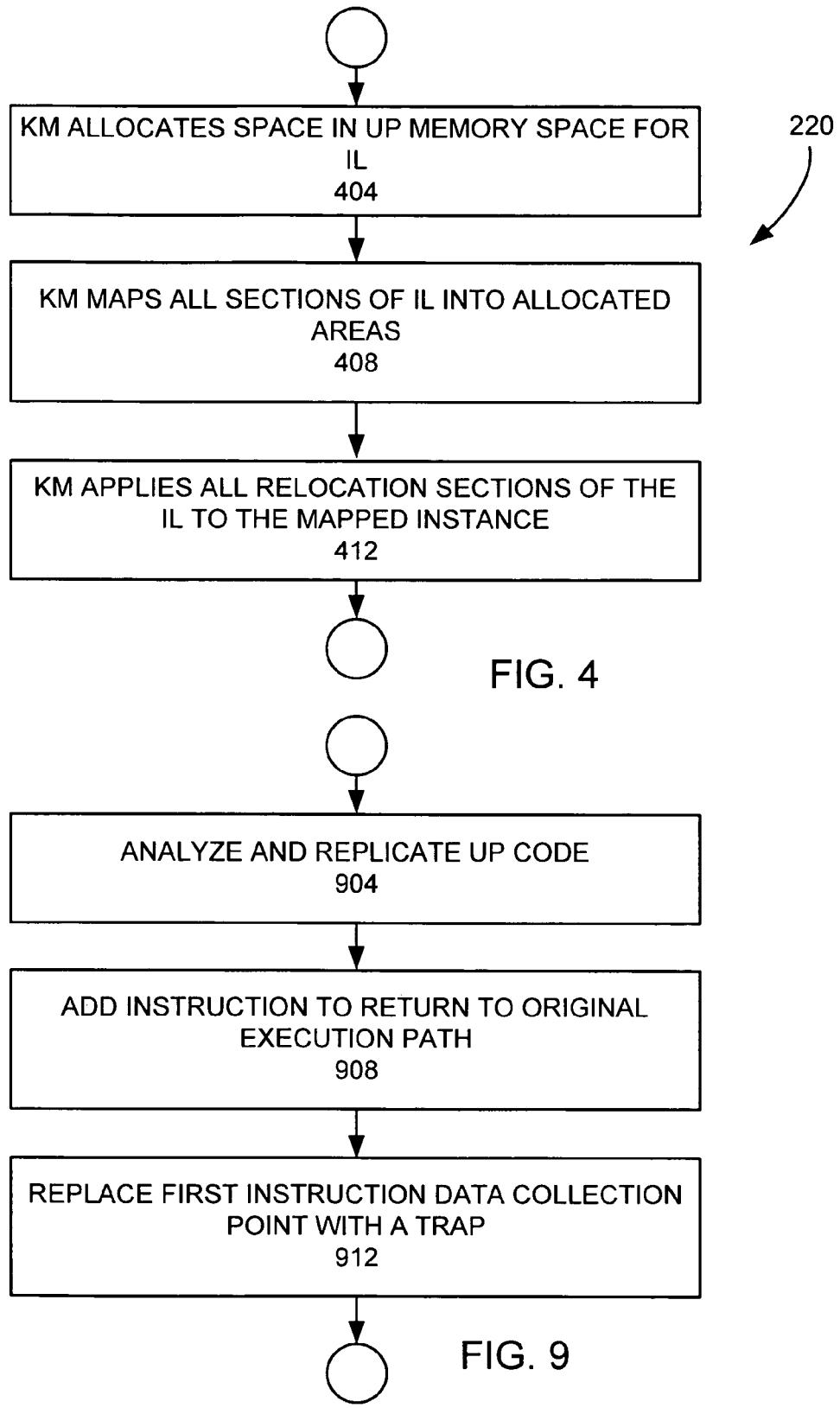

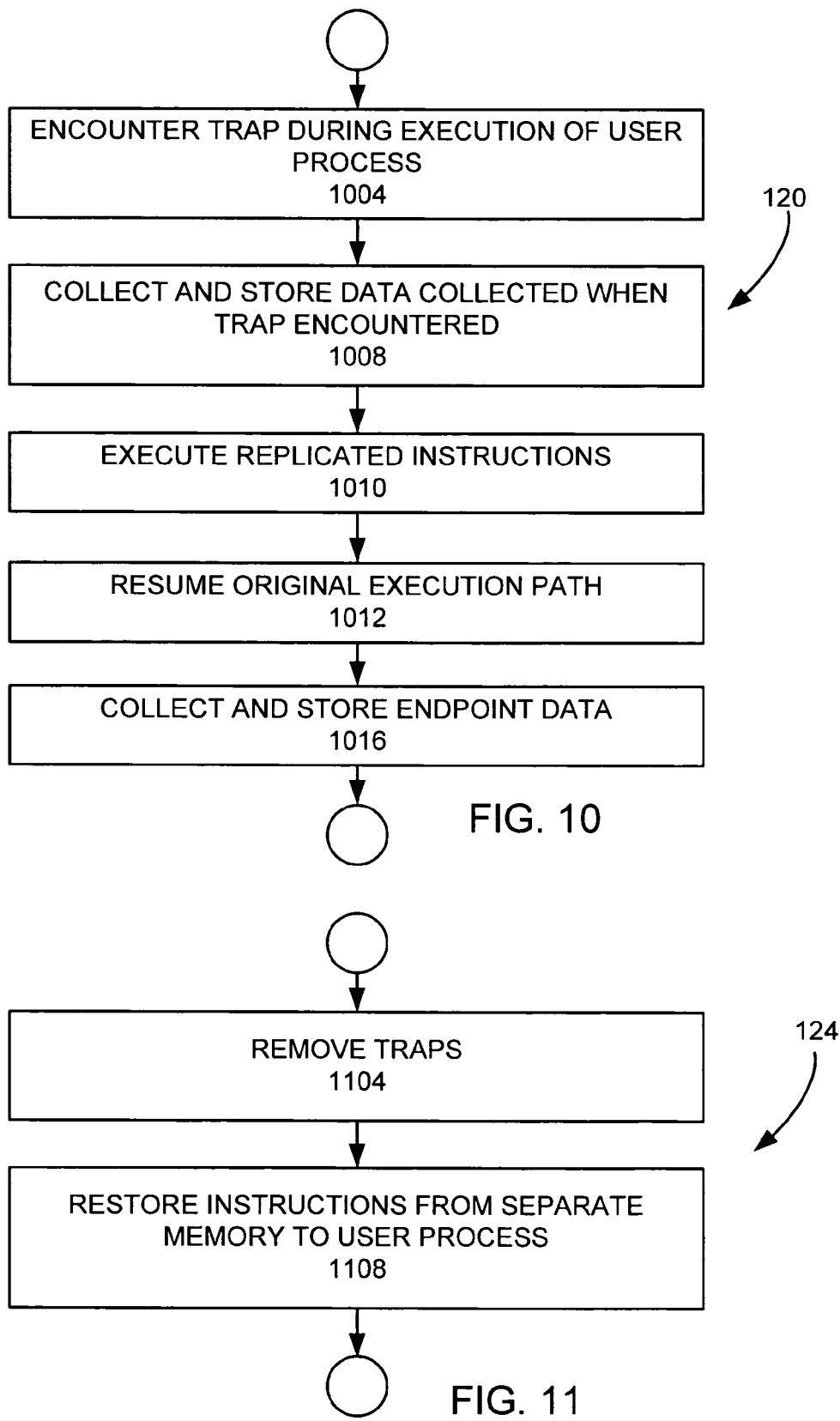

USER PROCESS OBJECT CODE INSTALLER

BACKGROUND OF THE INVENTION

The present invention relates to object code that can be installed on a running user process. More specifically the invention relates to data collection object code that can be installed on a running user process.

In testing computer code, operating system, or computer system data from computer code is collected. Some data collection code requires that a user process is stopped before the data collection code can be inserted into the user process.

SUMMARY OF THE INVENTION

To achieve the foregoing and other objects and in accordance with the purpose of the present invention a computer implemented method for installing a code object in a user process virtual memory space, while the user process is running, is provided. The user process is run in a virtual memory space. A controller process is run in a different virtual memory space than the user process. The control process requests to a kernel module to install the code object into the virtual memory space of the user process. The kernel module installs the code object into the virtual memory space of the user process, while the user process is running.

In another manifestation of the invention a computer implemented method for collecting data in a user process running in a memory space is provided. The user process is run in a memory space. A controller process is run in a different memory space than the user process. The controller process requests to have traps installed to collect data from the user process. A kernel module installs traps to collect data from the user process. At least one of the installed traps is encountered, while the user process is running. The specified events of the user process are recorded in memory or a file when the at least one trap is encountered. The recorded specified events are accessed in memory through the controller process.

In another manifestation of the invention, a computer implemented method for collecting data in a user process is provided. The user process is run in a virtual memory space. A controller process is run in a different virtual memory space than the user process. A kernel module installs the code object into the virtual memory space of the user process, while the user process is running. A function in the installed code object is run, where the function creates a data collection object to record specified events in the user process, while the user process is running. The specified events of the user process are recorded in memory. The recorded specified events in memory are accessed through the controller process.

In another manifestation of the invention a computer implemented method of collecting data from a user process is provided. The user process is run. Code is copied, code that is overwritten by the trap, from the user process to separate memory. The copied code is replaced with a trap. Instructions are added after the copy of the code in separate memory to direct a process to a point in the user process after the trap. The trap is encountered during an execution of the user process, wherein the trap sends the execution to the copy of the code in separate memory. The copy of the code is executed in separate memory. The added instructions are executed to return execution to the user process' original execution path.

In another manifestation of the invention computer readable media for installing a code object in a user process virtual memory space, while the user process is running is provided. Computer readable code for running the user process in a virtual memory space is provided. Computer readable code for running a controller process in a different virtual memory space than the user process is provided. Computer readable code for requesting from the control process to a kernel module to install the code object into the virtual memory space of the user process is provided Computer readable code for having the kernel module install the code object into the virtual memory space of the user process, while the user process is running is provided.

In another manifestation of the invention computer readable media for collecting data in a user process running in a memory space is provided. Computer readable code for running the user process in a memory space is provided. Computer readable code for running a controller process in a different memory space than the user process is provided. Computer readable code for requesting through the controller process to have traps installed to collected data from the user process is provided. Computer readable code for having a kernel module install traps to collected data from the user process is provided. Computer readable code for encountering at least one of the installed traps, while the user process is running is provided. Computer readable code for recording the specified events of the user process in memory or a file when the at least one trap is encountered is provided. Computer readable code for accessing the recorded specified events in memory through the controller process is provided.

In another manifestation of the invention computer readable media for collecting data in a user process is provided. Computer readable code for running the user process in a virtual memory space is provided. Computer readable code for running a controller process in a different virtual memory space than the user process is provided. Computer readable code for having a kernel module install the code object into the virtual memory space of the user process, while the user process is running is provided. Computer readable code for running a function in the installed code object, where the function creates a data collection object to record specified events in the user process, while the user process is running is provided. Computer readable code for recording the specified events of the user process in memory is provided. Computer readable code for accessing the recorded specified events in memory through the controller process is provided.

Another manifestation of the invention provides computer readable media for collecting data from a user process. Computer readable code for running the user process is provided. Computer readable code for copying code from the user process to separate memory is provided. Computer readable code for replacing the copied code with a trap is provided. Computer readable code for adding instructions after the copy of the code in separate memory to direct a process to a point in the user process after the trap is provided. Computer readable code for encountering the trap during an execution of the user process, wherein the trap sends the execution to the copy of the code in separate memory is provided. Computer readable code for executing the copy of the code in separate memory is provided. Computer readable code for executing the added instructions to return execution to the user process is provided.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a more detailed flow chart of how a kernel module makes itself run in the context of the user process that the library is going to be installed in.

FIG. 4 is a more detailed flow chart of how the library is installed into the user process memory area.

FIG. 8 is a detailed flow chart of how the user-process continues execution.

FIG. 9 is a more detailed flow chart of the process of installing data collection code into the user process.

FIG. 10 is a more detailed flow chart of a data collection step.

FIG. 11 is a more detailed flow chart of a data collection code removal step.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
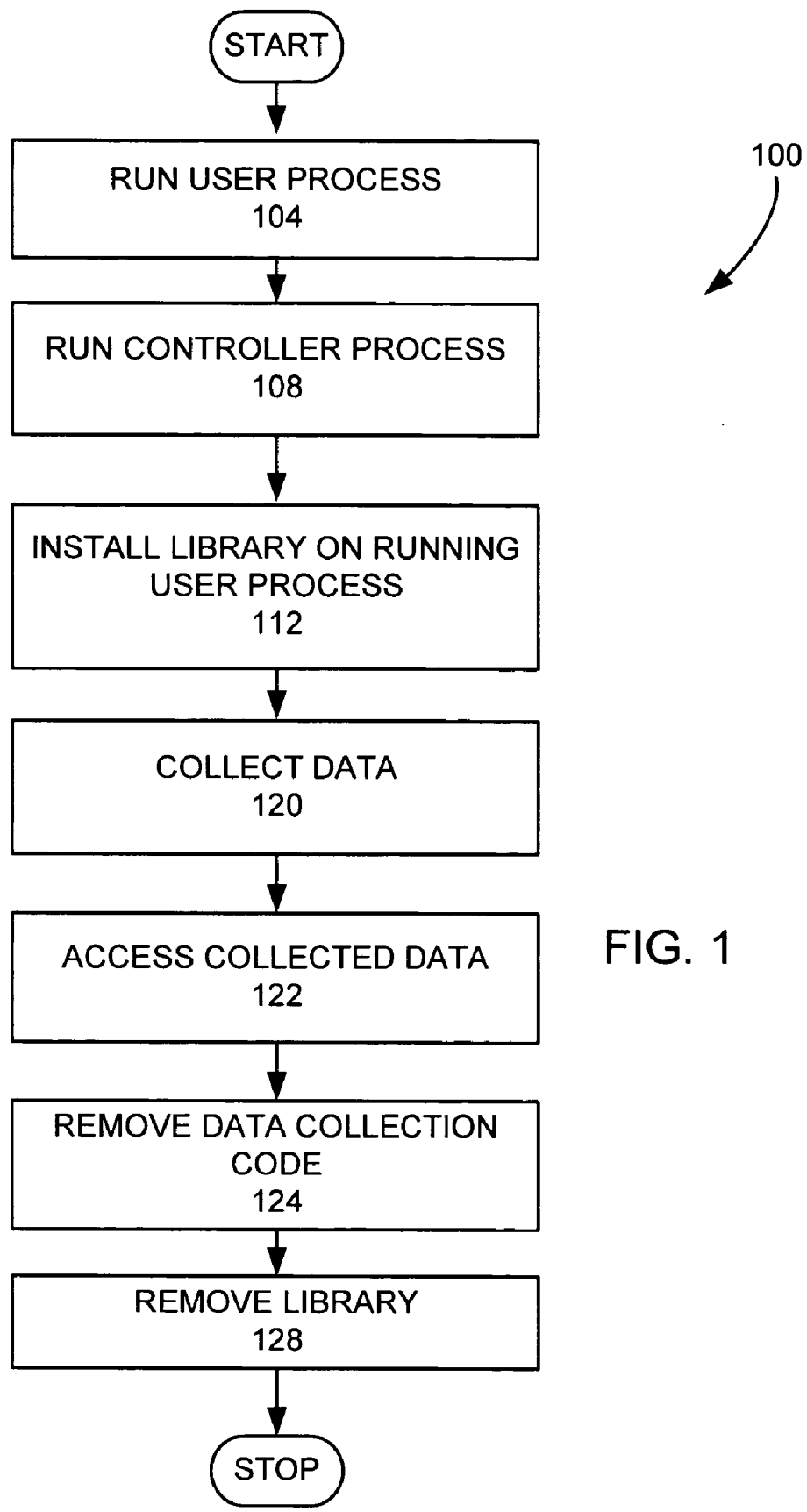
FIG. 1 is a high level flow chart of an embodiment of the invention.
Figure 5A:
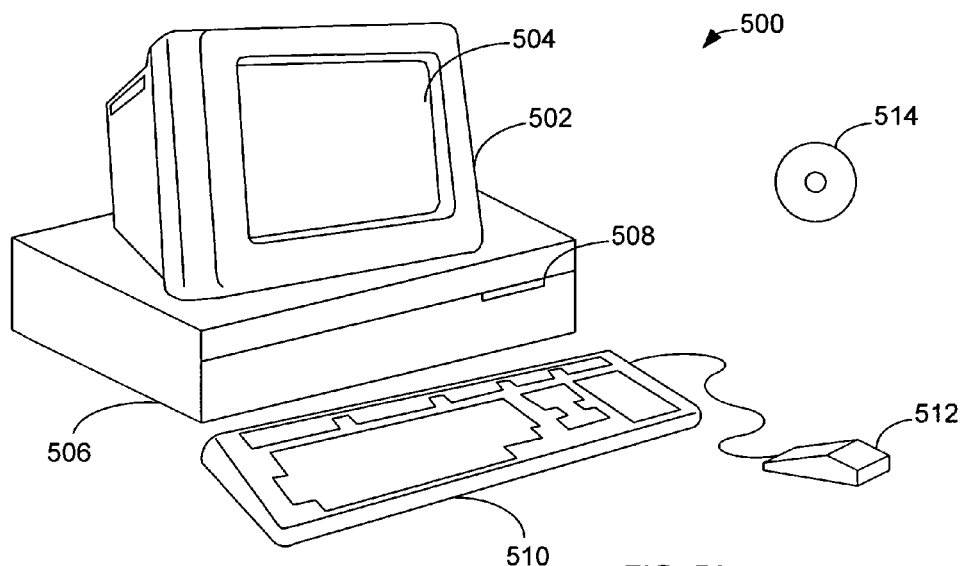
FIGS. 5A and 5B illustrate a computer system 500, which may be programmed to provide the inventive process.
Figure 5B:
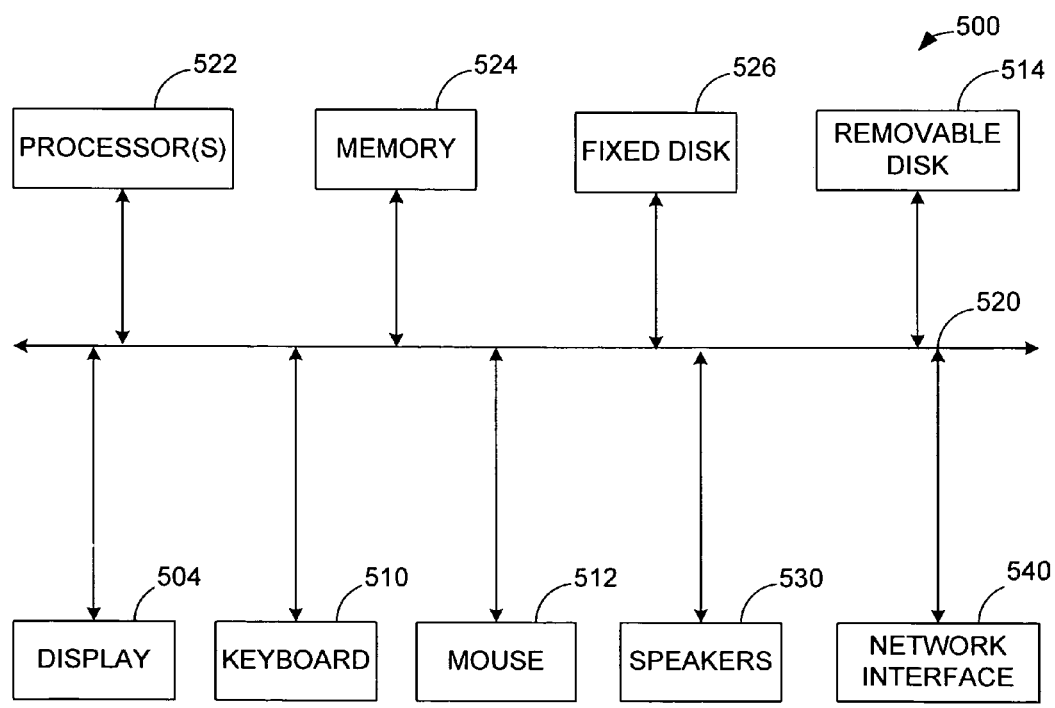

To facilitate understanding of the invention, FIG. 1 is a high level flow chart 100 of a process used in an embodiment of the invention. A user process is run on a computer system (step 104). FIGS. 5A and 5B illustrate a computer system 500, which may be programmed to provide the inventive process. FIG. 5A shows one possible physical form of a computer system that may be used to practice the invention. Of course, the computer system may have many physical forms ranging from an integrated circuit, a printed circuit board, and a small handheld device up to a huge super computer. Computer system 500 includes a monitor 502, a display 504, a housing 506, a disk drive 508, a keyboard 510, and a mouse 512. Disk 514 is a computer-readable medium used to transfer data to and from computer system 500.

FIG. 5B is an example of a block diagram for computer system 500. Attached to system bus 520 is a wide variety of subsystems. Processor(s) 522 (also referred to as central processing units, or CPUs) are coupled to storage devices, including memory 524. Memory 524 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable type of the computer-readable media described below. A fixed disk 526 is also coupled bi-directionally to CPU 522; it provides additional data storage capacity and may also include any of the computer-readable media described below. Fixed disk 526 may be used to store programs, data, and the like and is typically a secondary storage medium (such as a hard disk) that is slower than primary storage. It will be appreciated that the information retained within fixed disk 526 may, in appropriate cases, be incorporated in standard fashion as virtual memory in memory 524. Removable disk 514 may take the form of any of the computer-readable media described below.

CPU 522 is also coupled to a variety of input/output devices, such as display 504, keyboard 510, mouse 512 and speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon CPU 522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

The present invention is not restricted to be used on a physical computer as such. It is quite common that a physical computer may execute one or more virtual machines. The present invention can also be implemented on a virtual machine.

Figure 6A:
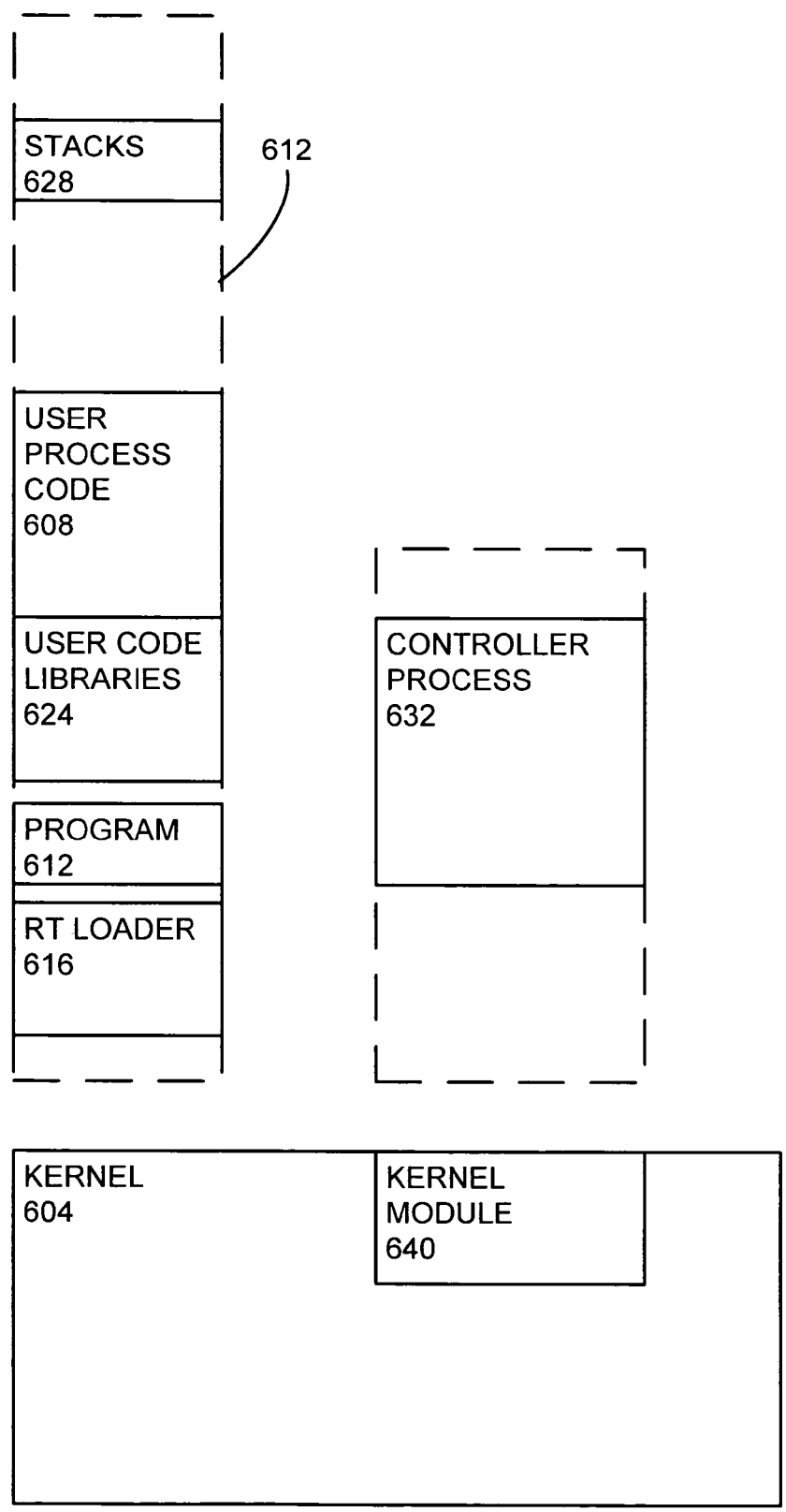
FIGS. 6A and 6B are schematic system diagrams of the relationships between an operating system and processes.

FIG. 6A is a schematic view of relationships between processes and an operating system (OS). The operating system is implemented using an operating system kernel 604. The operating system is a multitasking system that is able to run one or more processes at a time. A process may contain one or more threads. Each process is allocated virtual memory (memory space). Generally, a process is not able to write to the memory space allocated to another process in such multitasking system without the use of operating system services. In this embodiment, the multitasking operating system is Linux, although other multitasking operating systems may be used. Starting the user process creates a thread for the user process code 608 and a user process code memory space 612, which stores a run time loader 616, possible other programs 612, libraries for the user process 624, stacks 628, and other possible code.

A controller process code 632 is also run (step 108). Since the controller process code 632 is a separate process from the user process code 608, the controller process code 632 is stored in a separate memory space allocation than the user process code 608, with a separate thread. To run the controller process 632 the kernel provides a separate memory space and the controller process code 632 with a separate thread. The running of the controller process code (step 108) and user process code (step 104) may be done in opposite order or simultaneously.

The controller process causes a library to be installed in the virtual memory allocation of the user process while the user process is running (step 112). The running of the user process is defined as having memory space and a thread allocated to the user process. As mentioned before, generally an operating system prevents one process in one memory space to write code to a memory space of another process.

Figure 2:
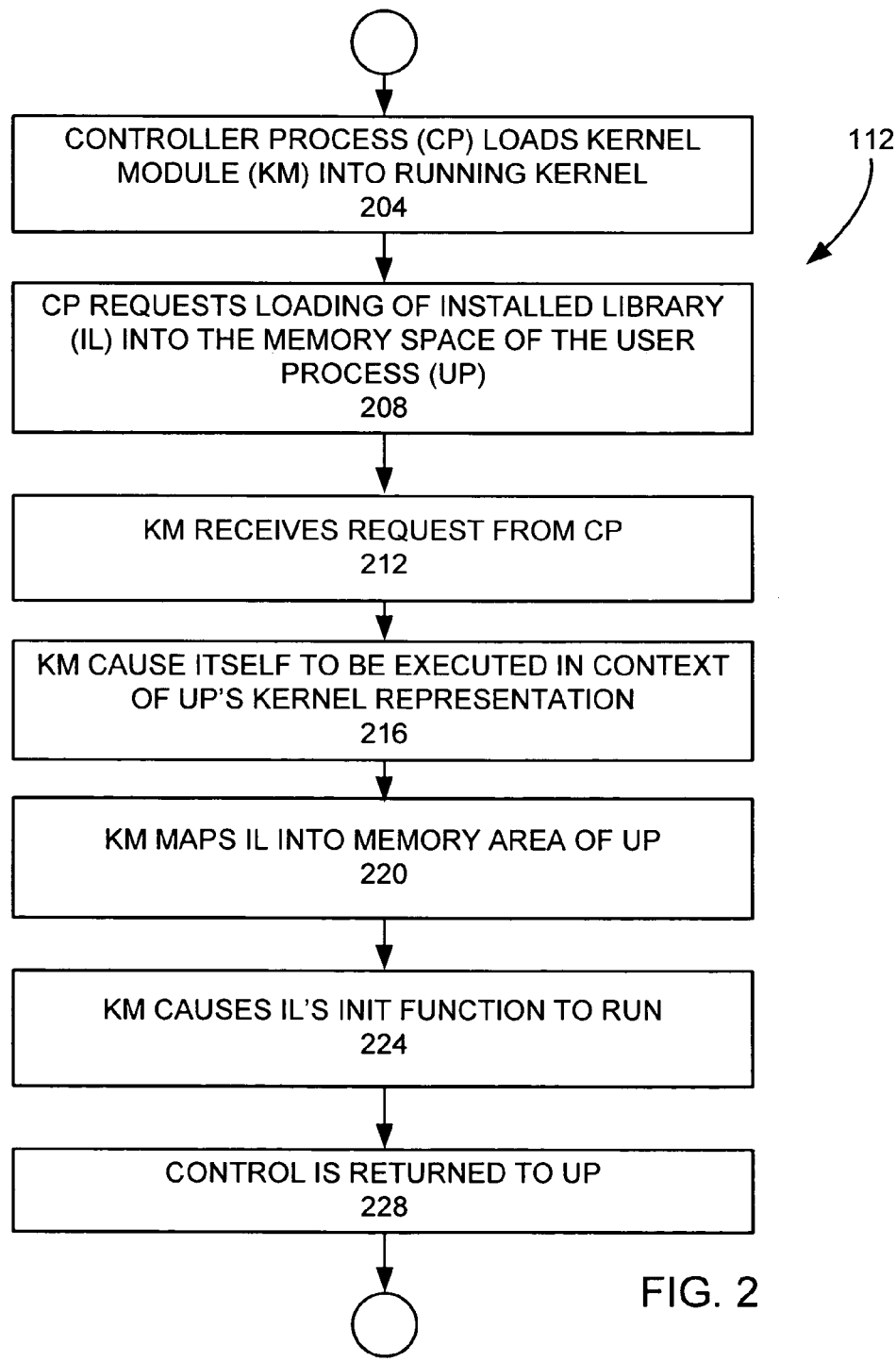
FIG. 2 is a more detailed flow-chart describing a method for injecting a library into the memory space of a user process.

FIG. 2 is a more detailed flow chart of a process that allows the controller process to install code in the memory space of the user process while the user process is running (step 112). The controller process (CP) loads a kernel module (KM) 640 into the running kernel (step 204). The actual loading of the KM is performed by an operating system service. In an alternative embodiment, the KM can also be compiled into a kernel. It is not a requirement of the invention that the KM can be loaded, but it is a requirement that the KM becomes a part of the operating system by some means, either statically (compiled into the kernel) or dynamically (loaded into the kernel either manually by a user or automatically when the kernel determines that the services of the KM are required). When the KM becomes a part of the operating services, it provides a set of services to user programs. These services are used to instruct the KM to inject and remove code from the user process and start and stop data-collection at specified points in the code. The KM contains logic that keeps track of user processes that have the code injected, when data-collection occurs and so forth. Thus, a KM controls one or more independent processes and also individual threads within a process. The control process requests the loading of an installed library (IL) into the memory space 612 of the user process (UP) (step 208). The kernel module 640 receives the request from the control process 632 (step 212).

The kernel module 640 causes itself to be executed in the context of the user process's kernel representative (step 216). FIG. 3 is a more detailed flow chart of this step. The kernel module 640 installs a hook into a callback (step 304), which is executed when the user process receives a signal. The word "signal" is a technical term used in UNIX patterned operating systems, such as Linux. The kernel module sends a signal to the user process (step 308). The user process receives the signal, which causes the code within the kernel module to execute, but now as part of the kernel handling the user process (in the context of the user process's kernel representative). The kernel module consumes the signal (step 316), so that the signal does not reach the user process.

Figure 6B:
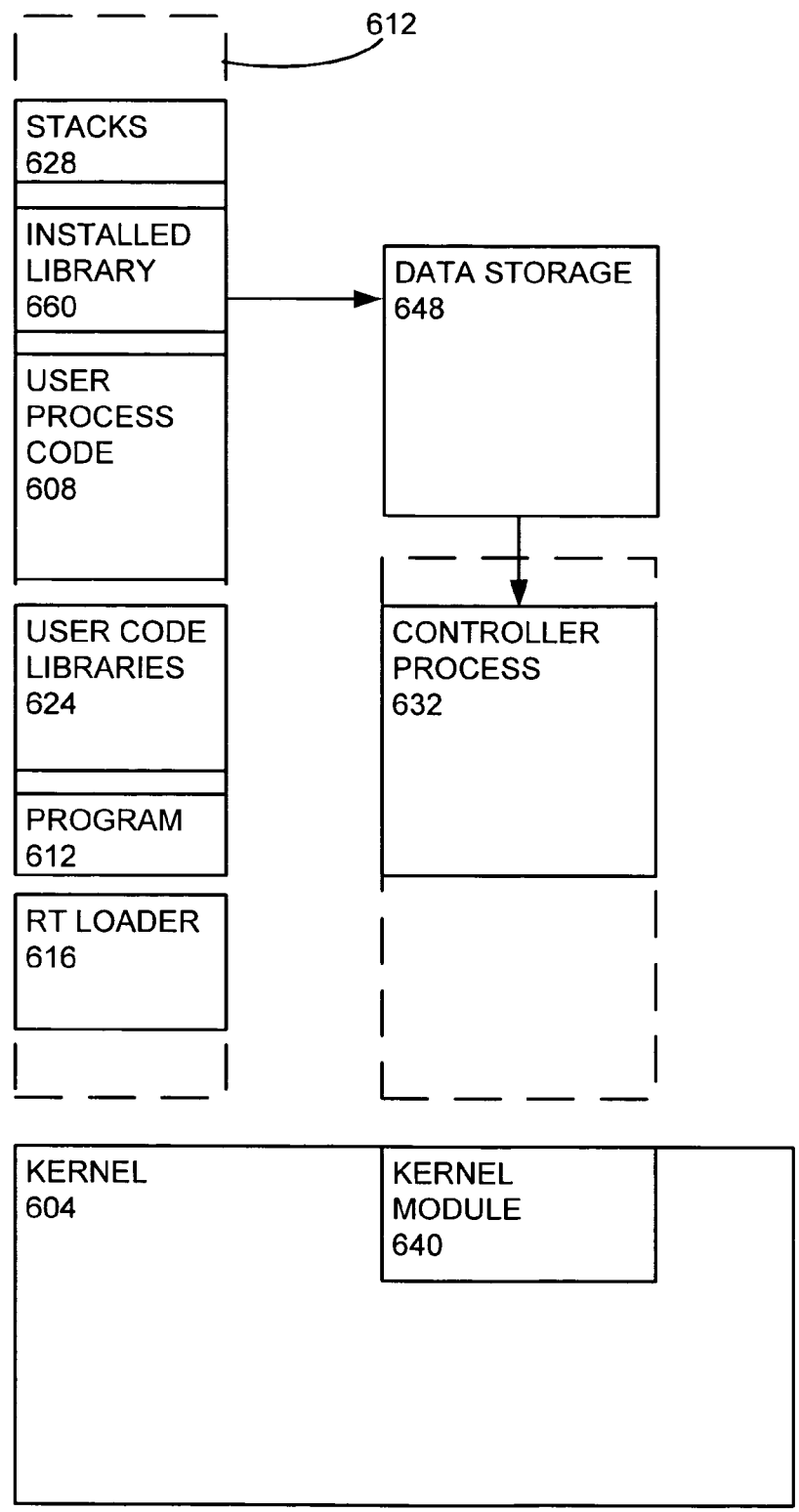

The kernel module 640 maps the installed library into the user-space memory area 612 of the user process (step 220). FIG. 4 is a more detailed flow chart of this step. The kernel module 640 allocates space within the user process virtual memory space 612 for all sections required by the installed library (step 404). The kernel module maps all sections of the installed library into the allocated areas (step 408). The kernel module applies all relocation sections of the installed library to the mapped instance (step 412). FIG. 6B is a schematic view of relationships between processes and an operating system (OS), which shows the installed library 660 installed in the virtual memory space 612 of the user process.

Figure 7:
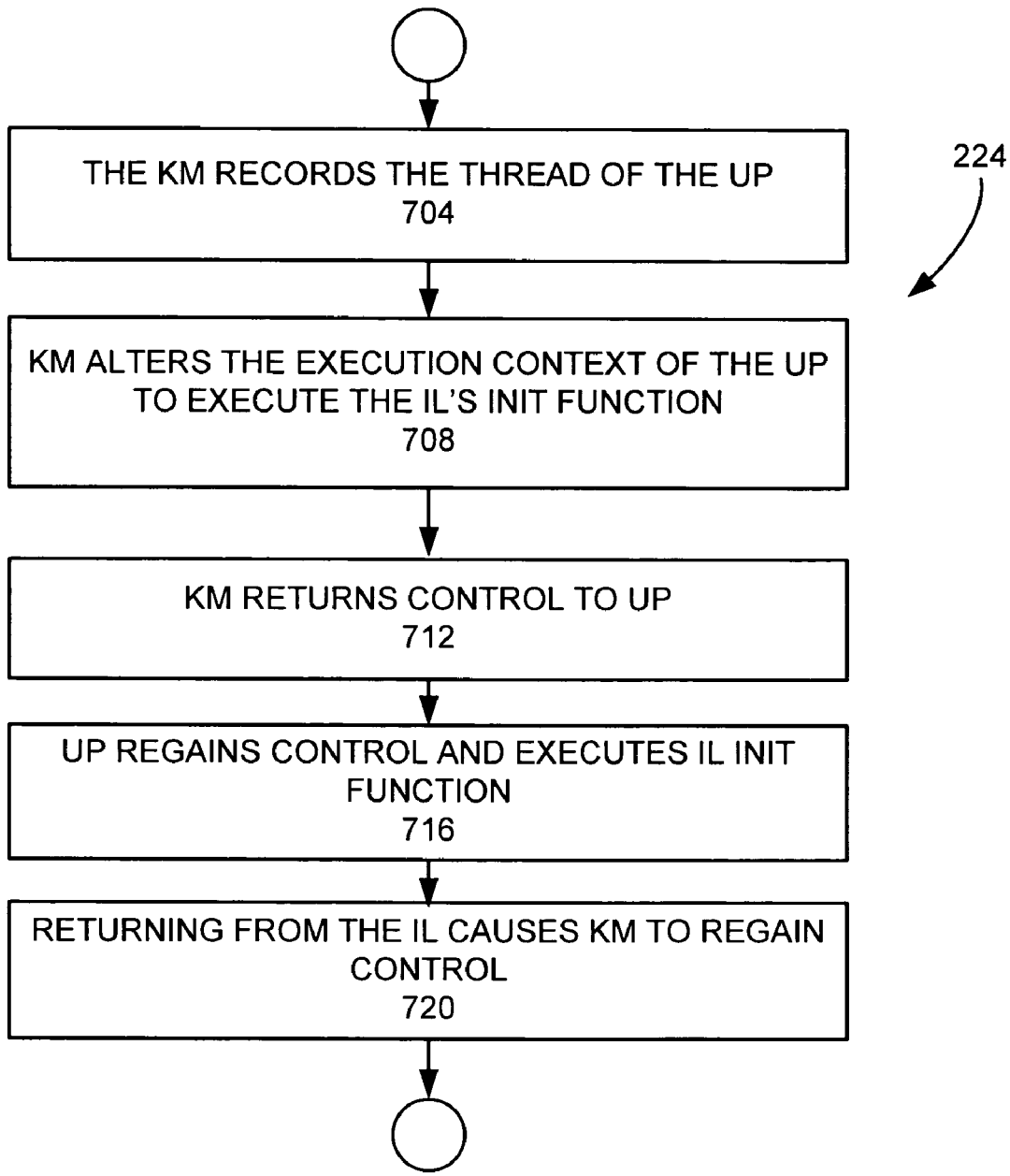
FIG. 7 is a more detailed flow chart of the kernel module causing the installed library's initialization-function to run.
Figure 13A:
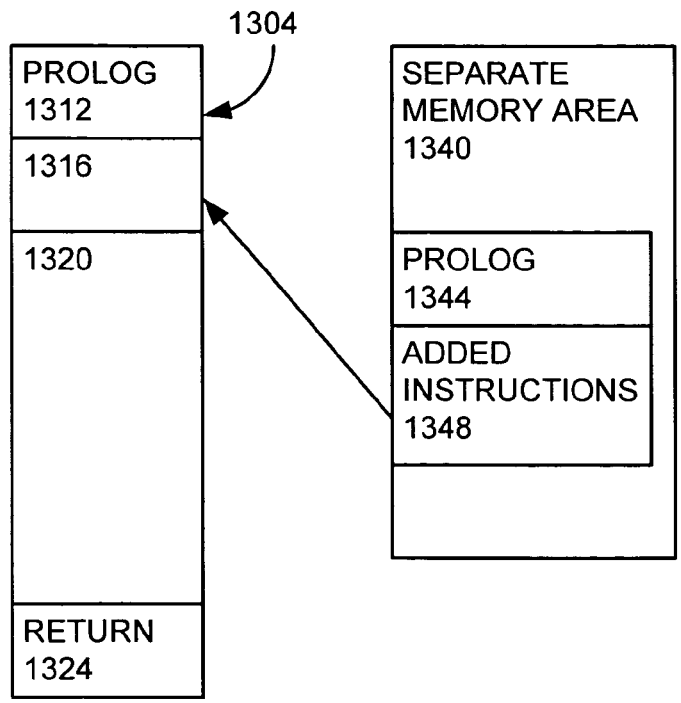
FIGS. 13A and 13B are schematic views of a function that forms part of a user process.
Figure 13B:
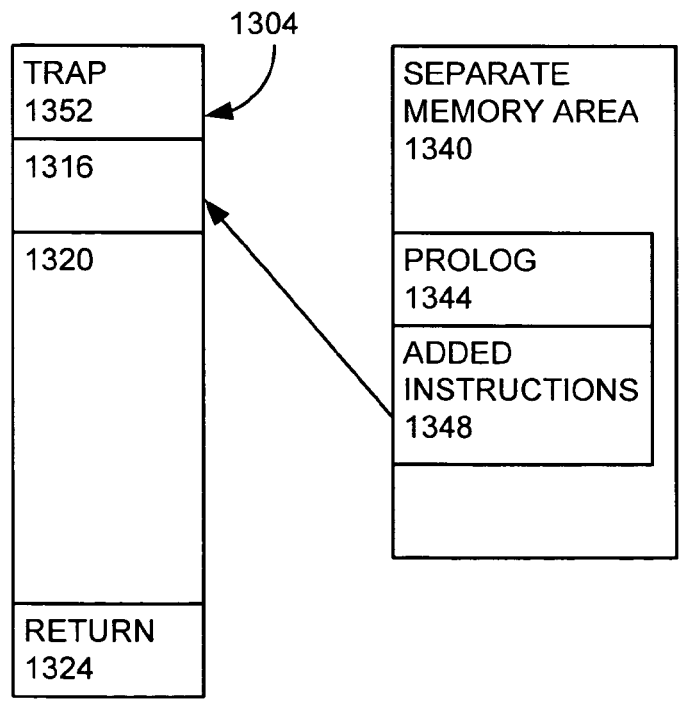

The kernel module 640 causes the installed library's initialization function to run (step 224). FIG. 7 is a more detailed flow chart of this step. The kernel module records the execution context of the thread of execution within the user process, which was subverted with the signal handling callback (step 704). The kernel module alters the execution context of the user process to cause the execution of the installed library's initialization function, once the user process regains control (step 708). The kernel module returns control to the user process (step 712). The user process regains control and executes the installed library's initialization function (step 716). In this embodiment of the invention, the install library init function installs data collection code into the user process. FIG. 9 is a more detailed flow chart of the process of installing data collection code into the user process. The user process is analyzed and instructions that will be overwritten by a trap in the user process are replicated in a separate memory area of the user process memory space (step 904). FIG. 13A is a schematic view of a function 1304 that forms part of the user process, which provides an example of how the data collection code is installed. The function has a beginning portion, designated a prolog 1312, a step subsequent to the prolog 1316, a main body 1320, and a return command 1324. A separate memory area 1344 is shown into which the part of the function prolog that is replaced is copied. Instructions 1348 are added to the user process to return to the original user process execution path (step 908). A first instruction (the prolog) of a data collection point is replaced with a trap 1352 (step 912), as shown in FIG. 13B. In this example, the traps raise an exception, which is handled in the kernel. After the installed library's initialization function is executed, the kernel module regains control (step 720). Traps may be placed in other places of the function, such as in the middle or end of the function or in other places in the user process.

A trap is defined as a mechanism to change the execution path of the user-process without the user process knowing about it. I.e. no special compilation or linking is required. Two types of traps may be used in this invention. Type 1 is an exception trap, which is a special instruction that causes the CPU to raise an exception and force the CPU into an exception handling mode. Exceptions are handled in kernel-space, either in the kernel-context of the current UP or in a kernel specific context unrelated to a UP. Type 2 is a sequence of instructions that alters the execution path, e.g. jumping to data-collection code, without raising an exception. I.e. the kernel is not invoked. In data-collection code, both types of traps can be used interchangeable and which one to use depends on what is being achieved. If the kernel should be made aware of the data-collection, then exception traps should be used. Otherwise, instruction traps should be used. Both types may be accompanied with some information about the trap, e.g. in a memory location.

Control is then returned to the user process 608 (step 228). FIG. 8 is a more detailed flow chart of this step. The kernel module 640 restores the original execution context of the thread of execution within the user process (step 804). The user process continues execution normally (step 808), which completes the installing the library on the running user process (step 112). Other embodiments of the invention may install traps after the installed library has been installed and the init function has run.

Figure 14:
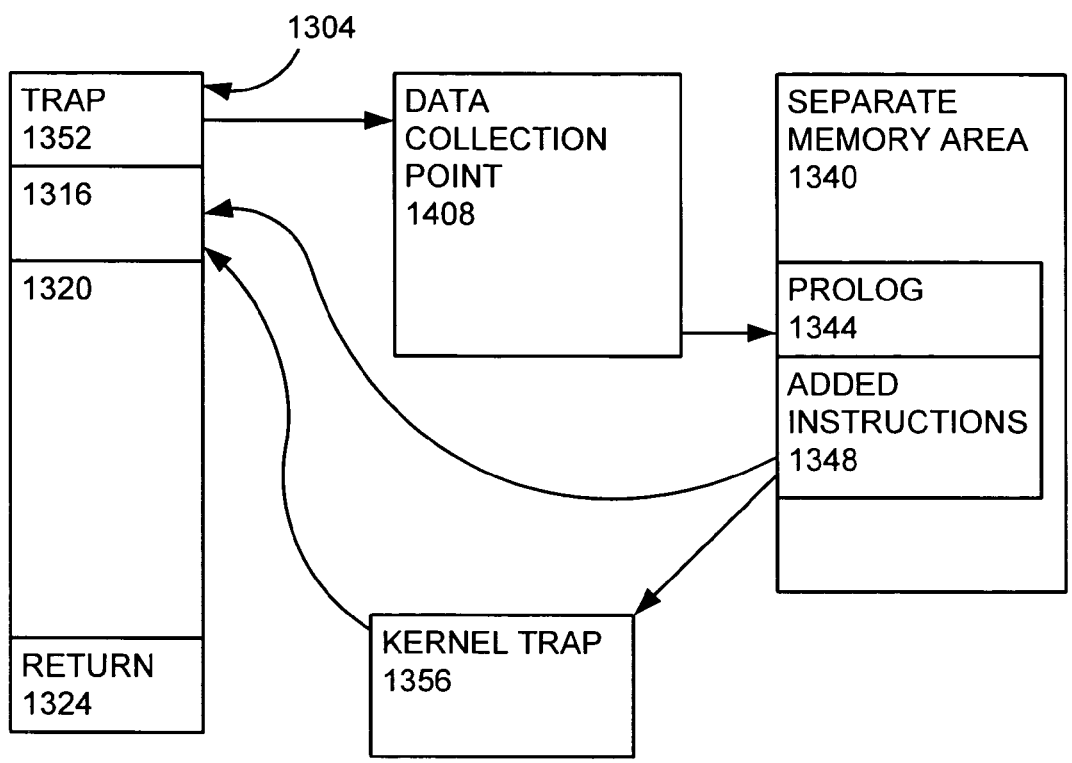
FIG. 14 schematically illustrates entry point data collection.

Data is then collected (step 120). FIG. 10 is a more detailed flow chart of the data collection step. During the execution of the user process, a trap placed by the init function of the install library is encountered (step 1004). FIG. 14 schematically illustrates entry point data collection, using the data collection code illustrated of FIG. 13B. When the function 1304 is called, the trap 1352 is encountered. The trap 1352 sends control to the data collection point 1408, as shown, so that data is collected and stored when the trap is encountered (1008). The collected data may be stored in data storage 648, as shown in FIG. 6B. The data storage may be a file, which is locally on the system on a local disk or a file in another place on a network or a memory space accessible shared between the user-process(es) and the control process. The replicated instructions are then executed (step 1010). In this example, this is done by having the data collection point 1408 pass control to the prolog 1344 in the separate memory area 1340. The prolog 1344 executes the first step(s) of the function and then added instructions 1348, which pass control back to the next step 1316 of the function 1304, as shown. Then the function 1304 resumes the original execution path. If data from the entry point of the function is collected and it has been decided that data is collected at the end of the function (1324) then the added instructions will return to the original execution path (1316) without the help of the kernel, e.g. an instruction trap. However if there is no separate entry and exit point, i.e. data-entry and data-exit coincides, then control is returned to the kernel with an exception trap (1356). The original execution path of the user process is then resumed (step 1012). The kernel restores the UP original return address (1316) and the UP continues execution.

A data-collection point is defined as having an entry and may have an exit point, depending on what type of data is being collected. Some data collection processes collect endpoint data that a function may provide once the function is completed. In such a case, an optional collect and store endpoint data step (step 1016) is provided.

Figure 12:
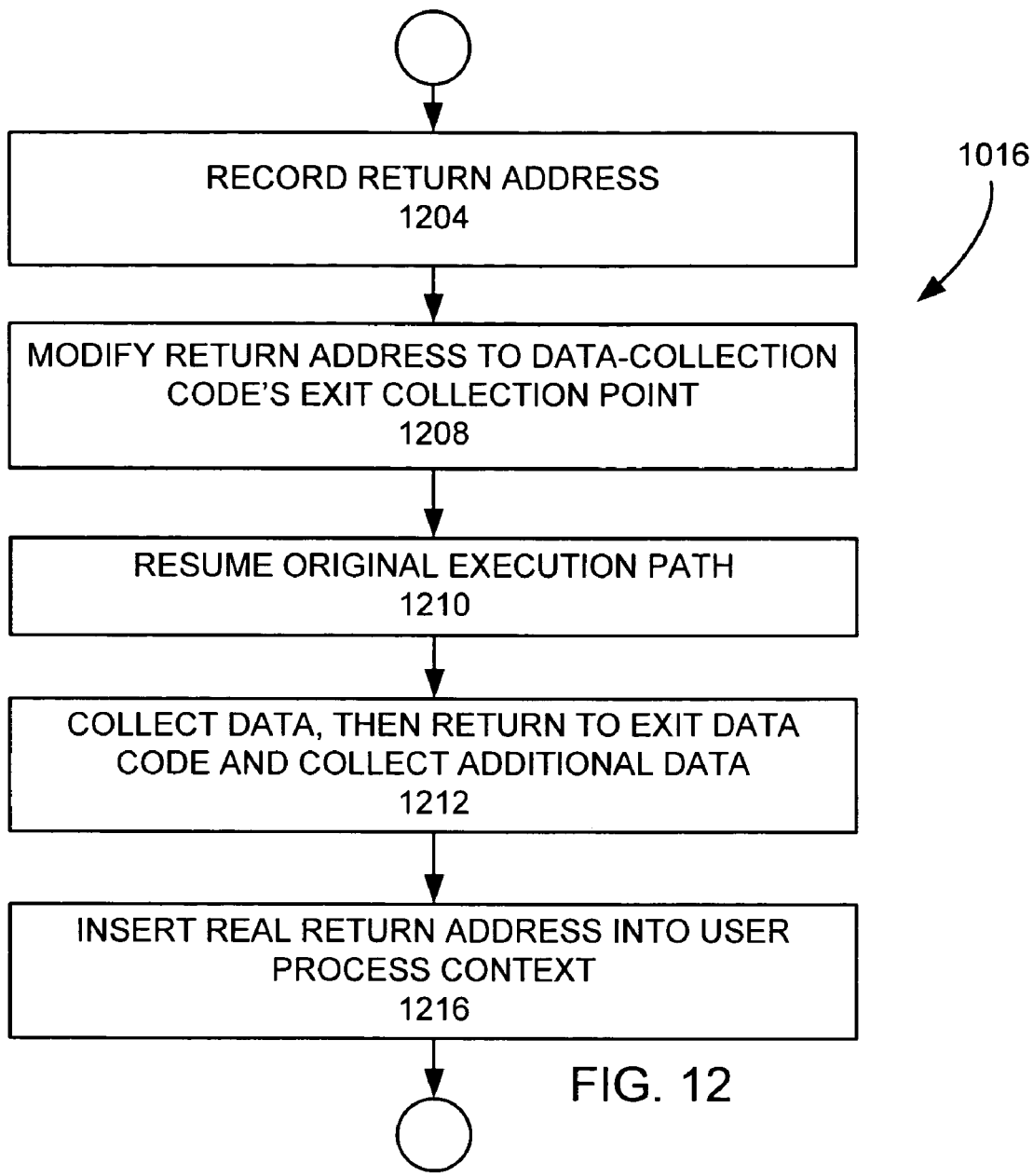
FIG. 12 is a more detailed flow chart of the endpoint data collection process.
Figure 15:
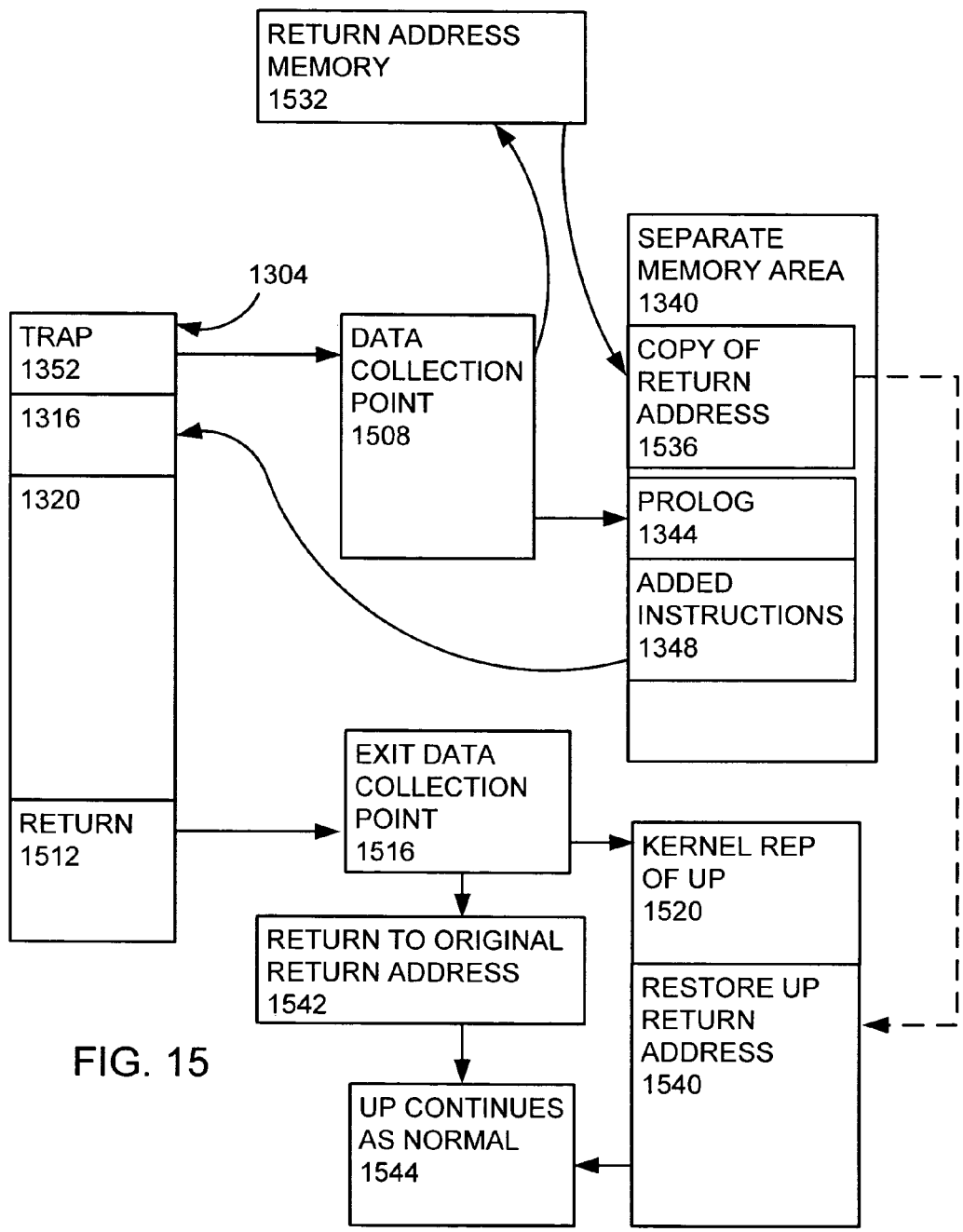
FIG. 15 schematically illustrates exit point data collection.

FIG. 12 is a more detailed flow chart of the endpoint data collection process. FIG. 15 schematically illustrates entry point data collection, using the data collection code illustrated of FIG. 13B. When a user process calls a function, the address to return to is saved in the CPU or memory, which is indicated as return address memory 1532. The user process typically saves this address for later use, so that the function may return to the caller. When the function 1304 is called, the trap 1352 is encountered. The trap 1352 sends control to the data collection point 1508, as shown. The data collection point 1508 causes the return address, stored in the return address memory 1532, of the user process to which the function 1304 returns to be recorded in separate memory 1340 as a copy of the return address 1536 (step 1204). The return address could be recorded in a different memory area than the prolog. The data collection point 1508 writes in the return address memory 1532 the address of the exit data collection point 1516 (step 1208). In this embodiment, these two steps (steps 1204 and 1208) are done every time the function is called, since the return address may be different each time the function is called. The prolog 1344 and added instructions 1348 cause the next step 1316 to be performed, so that the function resumes the original execution path (step 1210). When the function executes the return command 1512, the return command 1512 will use the return address memory 1532 either directly or from a saved location (register or memory) to determine the address to return to. Since the exit data collection point 1516 address is in the return address memory 1532, the return command 1512 will return to the exit data collection point 1516, where the exit data collection point 1516 collects data and does a trap (step 1212). The data collection may take a snap shot of values of the function at this point. These values may be recorded and stored. The trap causes the kernel representative 1520 to execute and causes the restoration of the real return address, which is obtained from the copy of the return address 1536 and is inserted into the user process' context in the kernel 1520 (step 1216) to restore the UP return address 1540. When the user-process resumes execution, it will continue as before (1544). The exit trap forces the kernel module to insert the return address back into the user process' context. How the return address is inserted into the user process' context is CPU dependent and includes, but is not limited to, explicitly re-writing of the CPU program counter or modifying the stack. An alternative path may be used by the exit data collection point 1516, which goes to a step of returning to the original return address 1542 which then causes the UP to continue as normal 1544. This alternative path allows such a process to avoid the kernel.

In other embodiments, if the kernel does not need to know that the exit-code is done, and the CPU makes it possible, it is not necessary to execute the trap to the kernel. Instead, the user process return address is updated in the exit code.

Figure 16:
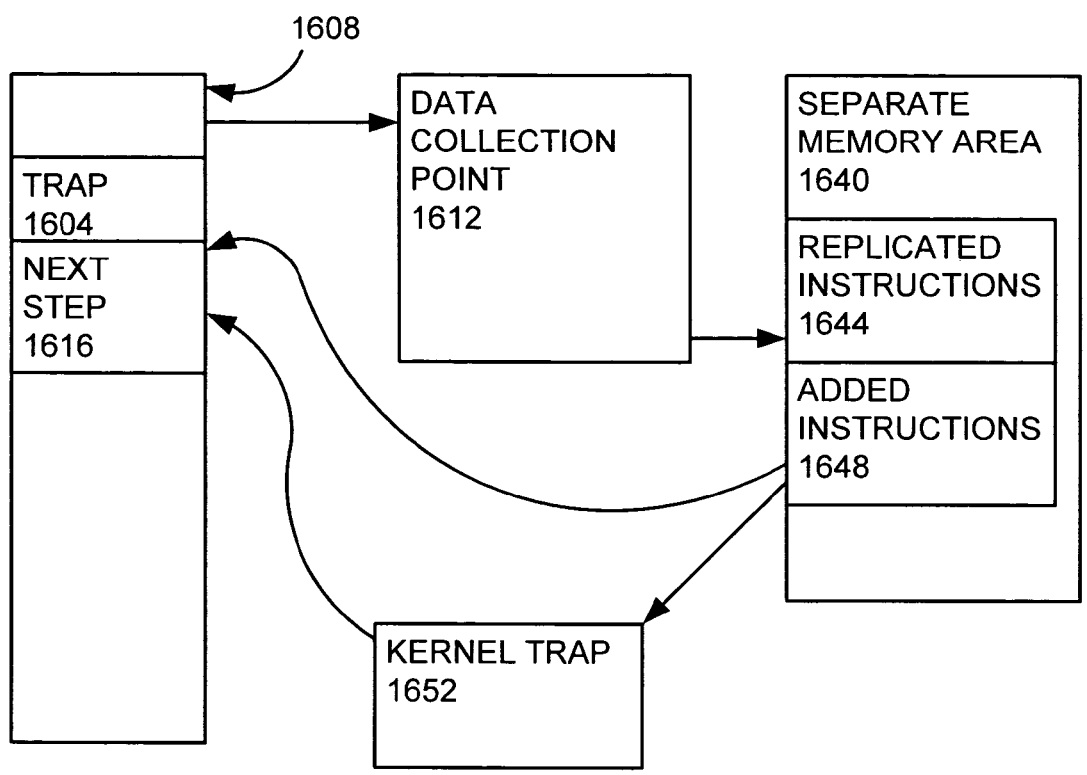
FIG. 16 schematically illustrates entry point data collection where a trap is placed at some point in the user process.

FIG. 16 schematically illustrates entry point data collection where a trap 1604 is placed at some point in the user process 1608, which in this example is not part of a called function. To set up the data collection code, a process similar to the above example is used. Namely, code in the user process is copied to separate memory 1640, where the copied code is shown as replicated instructions 1644. Added instructions 1648 are also added to the replicated instructions 1644. The added instructions are used to designate where the process should jump to. The trap 1604 is then placed in the user process 1608 at the source of the replicated instructions. In operation, when the user process 1608 is executing and the trap 1604 is encountered, the trap 1608 sends control to the data collection point 1612, which records the execution of the trap 1604. The replicated instructions 1644 and the added instructions 1648 are executed. If the data collection only notes the encounter of the trap, the added instructions cause to process to continue to the next step 1616 in the user process and the user process 1608 continues to execute. If the data collection wants to notify the kernel that it is done, then the added instructions cause the execution of a kernel trap 1652. The kernel trap 1652 records the values of the user process at this point, and then the user-process resumes execution as before by modifying the UP context to continue at (1616).

The collected data is accessed by the controller process (step 122). Accessing the collected data by the controller process 632, while the data collection code is installed and while the user process is running, allows for a real time analysis of the user process, while the user process is running. Other embodiments may allow other programs either locally or over a network to access the collected data in real time to allow a real time analysis of the user process while the user process is running. Other embodiments may access the collected data after the data collection code is removed.

The data collection code is then removed (step 124), which is accomplished by restoring the original user process code. FIG. 11 is a more detailed flow chart of the data collection code removal step. The traps are removed (step 1104). The instructions that were copied to a separate memory are restored back to the user process (step 1108). The invention allows data-collection points to be added and removed dynamically, while the library is loaded. The data collection code 1408 in this embodiment is located in the installed library. Other methods may be used to remove the data collection code, by reversing the installation process.

The kernel module 640 is then used to remove the install library 128, while the user process is running (step 128).

The ability of the invention to install and remove data collection code on a running user process allows for diagnostics and analysis to be performed on running code, which provides greater testing ability. In addition, the invention is able to add such object code without recompilation of the user application.

The ability of one process in one memory space being able to install a code object into a user process in another memory space in a multitasking operating system provides various advantages. Therefore, another embodiment of the invention allows one process in one virtual memory space to install a code object (such as the installed library) into a user process in another virtual memory space. A user process is any computer code separate from the operating system that is run by the computer. The installation of the code object may also be called patching. The invention allows the installation of an arbitrary code into a user process memory space and to manipulate the user process to execute the arbitrary code without having been instructed to do so while compiling and linking.

The method described in this embodiment of the invention to collect user-data is not limited to virtual memory operating systems. However, the method of loading the installed library described in this embodiment is most beneficial for virtual memory operating systems.

Figure 17:
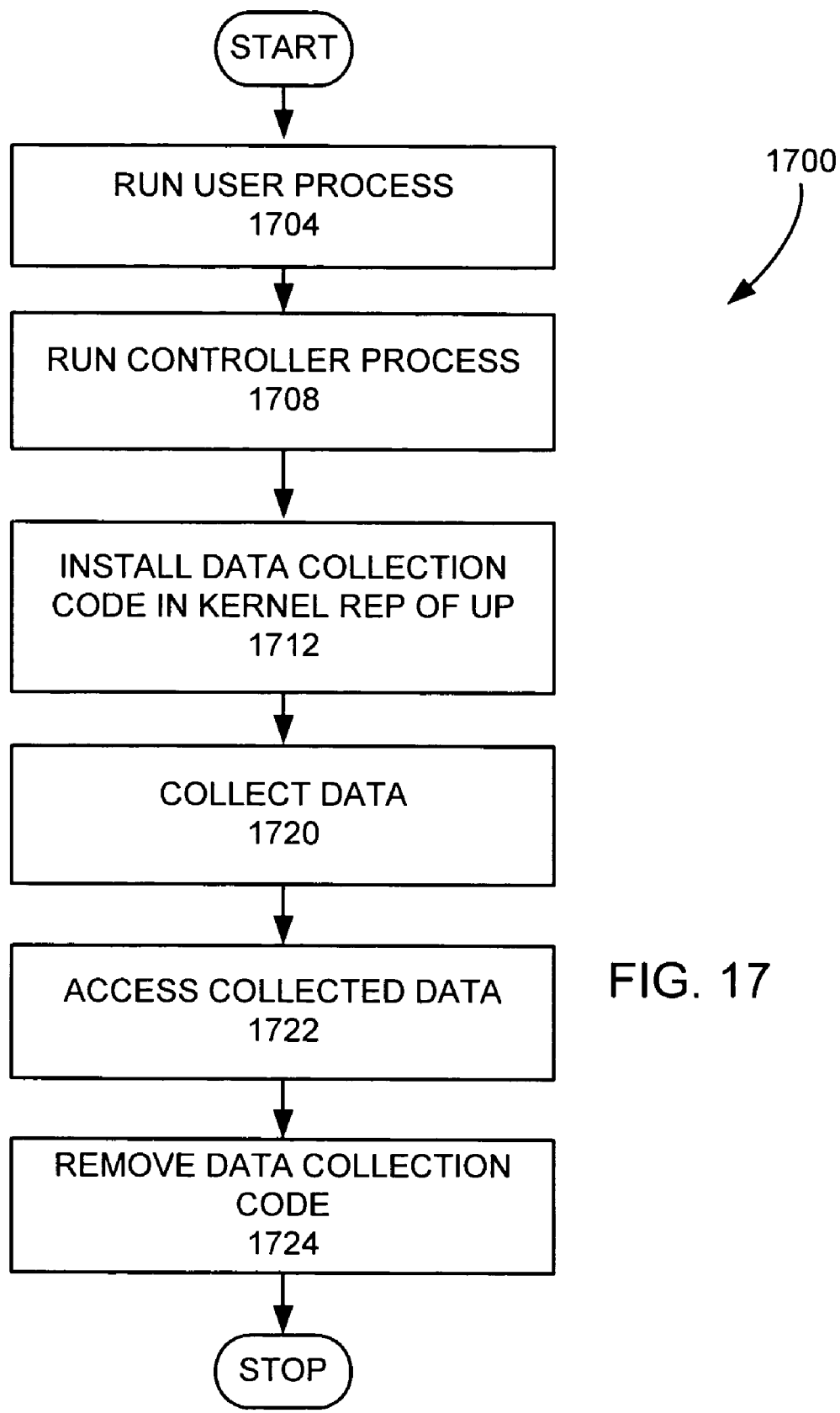
FIG. 17 is a high level flow chart of an embodiment that installs data collection code into a kernel representative of a user process.
Figure 18:
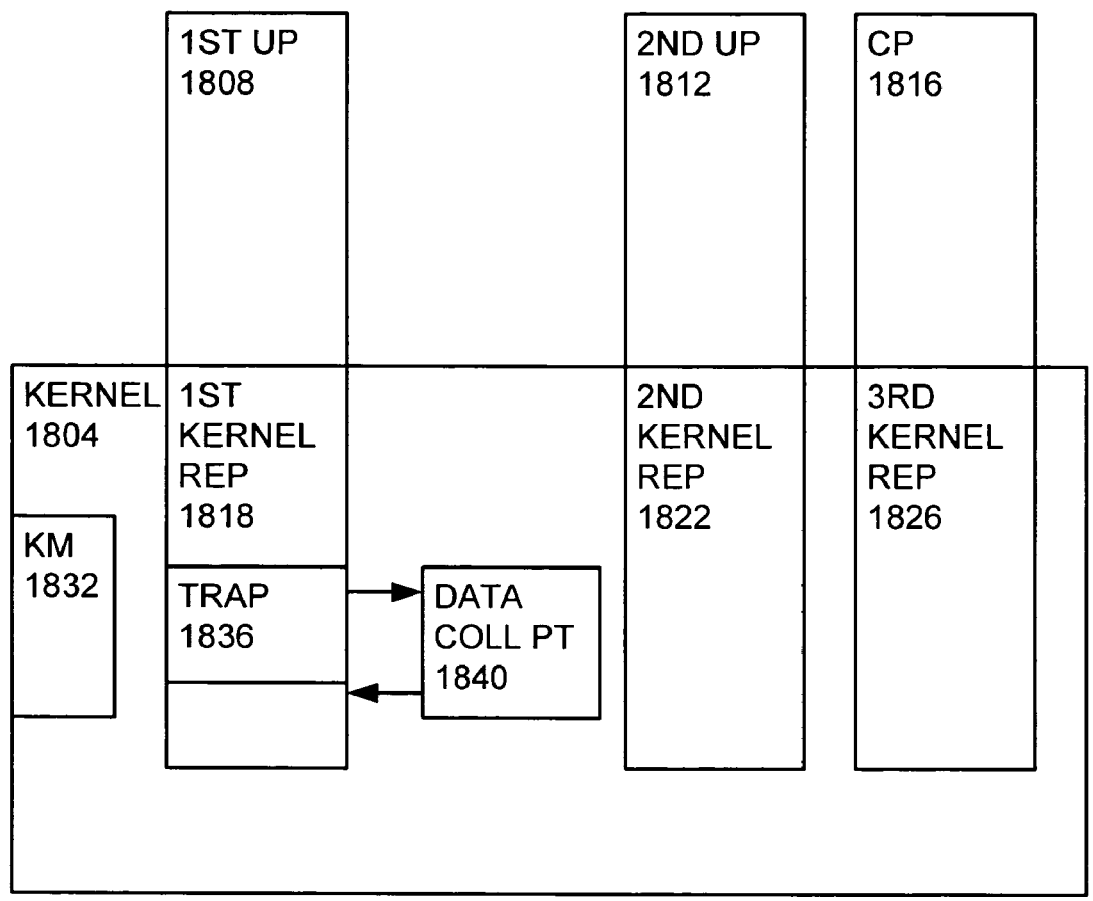
FIG. 18 is a schematic illustration of a memory system for a computer system.

Other embodiments of the invention may allow the installation of data collection without installing a library in the user process, but instead installs code into a kernel virtual address for the related user process. FIG. 17 is a high level flow chart 1700 of an embodiment that installs data collection code into a kernel representative of a user process. A user process is run (step 1704) and a control process is run (step 1708). These steps may be done in any order or simultaneously. Generally, the processes are running concurrently. FIG. 18 is a schematic illustration of a memory system for a computer system, with a kernel 1804, a first user process 1808 in a first virtual memory space, a second user process 1812 in a second virtual memory space, and a control process 1816 in a third virtual memory space. When a process is run, the operating system runs the process in a virtual memory space. The kernel has a first kernel representative 1818, which is a kernel representative of the first user process 1808, a second kernel representative, which is a kernel representative of the second user process 1812, and a third kernel representative 1826, which is a kernel representative of the control process 1816. These kernel representatives are created when the processes are run. In this embodiment, the kernel 1804 also has a kernel module 1832. In this embodiment, the first kernel representative 1818, the second kernel representative 1822, and the third kernel representative 1826 each begin with at the same virtual memory address, which in this embodiment is C0000000.

The invention may also be used in kernel only data-collection, such as the collection of data that is not from any particular user process, but from the kernel itself. The data-collection point may not need to be UP specific, but may be used for a number of UP's or may collect kernel data.

Data collection code is installed in the kernel representative of the user process (step 1720) or in other parts of the kernel unrelated to a UP. In this example, a trap 1836 is installed in the first kernel representative 1808 for the first user process 1808. Since each kernel representative begins with the same virtual memory address, it is easier to install a trap in the kernel representative, while the user process 1808 is running. In this embodiment, the kernel module 1832 is used to install the trap, although other embodiments may use compiled kernel code to accomplish this.

Traps are used to force execution into a known point in the kernel. If the process is already occurring in the kernel, a trap may not be needed. For example, if it is desired to record when data collection is performed, a trap would be used. If such information is not desired, then a trap would not be used.

Data is then collected (step 1720). As the first user process 1808 continues to run, the trap 1836 is encountered. The trap 1836 routes the execution process to a data collection point 1840, which collects and records data. The data collection point 1840 returns the execution process back to the first kernel representative 1818. By monitoring kernel representatives of a user process or control process, calls within the kernel on behalf of the user process, and calls and calls only within the kernel may be tracked. Generally, the options described above regarding the recording of values and entry and exit point data may be provided here using similar methods.

The collected data is accessed in real time as the user process is running (step 1722). In this embodiment, the controller process 1816 is used to provide access to the collected data. Other embodiments may not provide real time access, but the ability to provide real time access while the user process is running provides an advantage in this embodiment of the invention.

The data collection code is removed (step 1724). This step allows for the removal of the trap 1836 and the data collection point 1840 while the user process is running.

Some embodiments use a single computer to run the user process, control process, and to access the collected data. Other embodiments may perform such processes over a network. For example, the user process may be running on an embedded system and the collected data may be analyzed on another computer connected to the embedded system. In such a case, some parts of the control process would run on one computer and other parts of the control process would run on another computer. Generally, the part of the control process that involved in installing the library would run on the computer with the user process.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, modifications and various substitute equivalents as fall within the true spirit and scope of the present invention.

What is claimed is:

1. A computer readable storage medium including a set of instructions executable by a processor, the set of instructions being operable to:
    run a user process;
    copy code from the user process to separate memory;
    replace the copied code with a trap;
    add instructions after the copy of the code in separate memory to direct a process to a point in the user process after the trap;
    encounter the trap during an execution of the user process, wherein the trap sends the execution to the copy of the code in separate memory;
    execute the copy of the code in separate memory; and
    execute the added instructions to return execution to the user process.

2. Computer readable storage media including a set of instructions executable by a processor, the set of instructions being operable to:
    run a user process in a virtual memory space;
    run a controller process in a different virtual memory space than the user process;
    request from the control process to a kernel module to install a code object into the virtual memory space of the user process; and
    install, by the kernel module, the code object into the virtual memory space of the user process, while the user process is running.

3. The computer readable storage media of claim 2, wherein the set of instructions are further operable to cause the control process to cause the kernel module to be installed.

4. The computer readable storage media, as recited in claim 3, wherein the set of instructions are further operable to request, by the control process to the kernel module, to remove the installed code object from the running process.

5. The computer readable storage media, as recited in claim 4, wherein the set of instructions for having the kernel module install the object into the virtual memory space of the user process, includes instructions operable to map, by the kernel module, the code object into the virtual memory space of the user process.

6. The computer readable storage media, as recited in claim 5, wherein the set of instructions for having the kernel module map the code into the virtual memory space of the user process, includes instructions operable to:
- allocate, by the kernel module, space in the user process virtual memory space for the code object;
- map all sections of the code object into allocated areas; and
- apply all relocation sections of the code object to a mapped instance.

7. The code readable storage media, as recited in claim 6, wherein the set of instructions for having the kernel module install the code, includes instructions operable to:
- install, by the kernel module, a hook into a callback;
- send, from the kernel module, a signal to the user process;
- receive the signal at the user process, wherein the signal causes the execution of the callback, which causes the execution of the kernel module as part of the kernel handling of the user process; and
- consume, by the kernel module, the signal.

8. The computer readable storage media, as recited in claim 2, wherein the set of instructions are further operable to request, by the control process to the kernel module, to remove the installed code object from the running process.

9. Computer readable storage media, as recited in claim 2, wherein the set of instructions for having the kernel module install the code object into the virtual memory space of the user process,
- includes instructions operable to map, by the kernel module, the code object into the virtual memory space of the user process.

10. The computer readable storage media, as recited in claim 2, wherein the set of instructions for having the kernel module map the code object into the virtual memory space of the user process, includes instructions operable to:
- allocate, by the kernel module, space in the user process virtual memory space for the code object;
- map all section of the code object into allocated areas; and
- apply all relocation sections of the code object to a mapped instance.

11. The computer readable storage media, as recited in claim 10, wherein the set of instructions for having the kernel module install the code, includes instructions operable to:
- install, by the kernel module, a hook into a callback;
- send from the kernel module, a signal to the user process;
- receive the signal at the user process, wherein the signal causes the execution of the callback, which causes the execution of the kernel module as part of the kernel handling of the user process; and
- consume, by the kernel module, the signal.

* * * * *